United States Patent
Liu et al.

(10) Patent No.: US 10,928,825 B2
(45) Date of Patent: Feb. 23, 2021

(54) METHOD, DEVICE AND SYSTEM FOR CONTROLLING VEHICLE PASSING THROUGH INTERSECTION

(71) Applicants: Neusoft Corporation, Shenyang (CN); Neusoft Reach Automotive Technology (Shanghai) Co., Ltd., Shanghai (CN)

(72) Inventors: Wei Liu, Shenyang (CN); Wei Liu, Shenyang (CN); Zuotao Ning, Shenyang (CN)

(73) Assignee: NEUSOFT REACH AUTOMOTIVE TECHNOLOGY (SHANGHAI) CO., LTD., Shanghai (CN)

( * ) Notice: Subject to any disclaimer, the term of this patent is extended or adjusted under 35 U.S.C. 154(b) by 431 days.

(21) Appl. No.: 15/954,638

(22) Filed: Apr. 17, 2018

(65) Prior Publication Data
US 2019/0129437 A1 May 2, 2019

(30) Foreign Application Priority Data
Oct. 26, 2017 (CN) .......................... 201711013572.3

(51) Int. Cl.
*G08G 1/00* (2006.01)
*G05D 1/02* (2020.01)
(Continued)

(52) U.S. Cl.
CPC .......... *G05D 1/0223* (2013.01); *B60W 40/02* (2013.01); *G08G 1/056* (2013.01); *G05D 2201/0213* (2013.01)

(58) Field of Classification Search
CPC ........ G05D 1/0223; G05D 2201/0213; B60W 40/02; B60W 60/001; B60W 30/18154;
(Continued)

(56) References Cited

U.S. PATENT DOCUMENTS 6,191,704 B1 * 2/2001 Takenaga ............. G05D 1/0257
340/903
9,440,647 B1 * 9/2016 Sucan ............. B60W 30/18154
(Continued)

FOREIGN PATENT DOCUMENTS

CN 101033978 A 9/2007
CN 103177596 A 6/2013
(Continued)

OTHER PUBLICATIONS

JP2016122308A.English.Translation, Specification of Foreign Reference "JP2016122308" is translated in to English (Power by EPO and Google to translate the Specification of the Foreign Reference "JP2007061924"), Publication date Jul. 7, 2016. (Year: 2016).*
(Continued)

*Primary Examiner* — Khoi H Tran
*Assistant Examiner* — B M M Hannan
(74) *Attorney, Agent, or Firm* — Kilpatrick Townsend & Stockton LLP

(57) ABSTRACT

A method, device and system for controlling a vehicle passing through an intersection are provided. The method includes generating a reference running track based on coordinate of first road from which the vehicle is to leave and coordinate of second road into which the vehicle is to enter. The first road and the second road intersect at the intersection through which the vehicle is to pass. The method further includes generating, in real time, a preview track of vehicle based on coordinate of centroid of the vehicle, course of the vehicle and coordinate of the second road, comparing the preview track with the reference running track and acquiring running speed limit and turning angle of the vehicle based on the comparing, and controlling the vehicle to run at the turning angle and a running speed less than or equal to the running speed limit.

14 Claims, 8 Drawing Sheets

(51) Int. Cl.
*G08G 1/056* (2006.01)
*B60W 40/02* (2006.01)

(58) Field of Classification Search
CPC ........... B60W 30/18145; B60W 30/10; B60W 2720/24; G08G 1/056
USPC ...................................................... 701/117
See application file for complete search history.

(56) References Cited

U.S. PATENT DOCUMENTS

| | | | |
|---|---|---|---|
| 9,508,258 B2* | 11/2016 | Arai | ................... G01C 21/3655 |
| 9,669,827 B1 | 6/2017 | Ferguson | |
| 10,220,850 B2* | 3/2019 | Naserian | ......... B60W 30/18154 |
| 2015/0134204 A1 | 5/2015 | Kunihiro et al. | |
| 2017/0221366 A1* | 8/2017 | An | ................... G08G 1/096783 |
| 2017/0241794 A1 | 8/2017 | Koo et al. | |
| 2017/0259817 A1 | 9/2017 | Horiguchi | |
| 2017/0262709 A1* | 9/2017 | Wellington | .......... G05D 1/0088 |
| 2017/0301232 A1* | 10/2017 | Xu | ................... G08G 1/096775 |
| 2018/0144637 A1* | 5/2018 | Ikedo | ........................ G08G 1/04 |
| 2018/0170376 A1* | 6/2018 | Yamamoto | ............... B62D 6/00 |

FOREIGN PATENT DOCUMENTS

| | | |
|---|---|---|
| CN | 104411558 A | 3/2015 |
| CN | 107168305 A | 9/2017 |
| CN | 107176099 A | 9/2017 |
| DE | 102013203908 A1 | 9/2014 |
| JP | 2016122308 A | 7/2016 |
| WO | 2014006759 A1 | 1/2014 |

OTHER PUBLICATIONS

Japanese Office Action dated Apr. 9, 2019 in the corresponding JP application (application No. 2018-074834).

* cited by examiner

METHOD, DEVICE AND SYSTEM FOR CONTROLLING VEHICLE PASSING THROUGH INTERSECTION

CROSS REFERENCE TO RELATED APPLICATION

The present application claims priority to Chinese Patent Application No. 201711013572.3, titled "METHOD, DEVICE AND SYSTEM FOR CONTROLLING VEHICLE PASSING THROUGH INTERSECTION", filed on Oct. 26, 2017 with the State Intellectual Property Office of the PRC, which is incorporated herein by reference in its entirety.

FIELD

The present disclosure relates to the technical field of intelligent driving, and in particular to a method, a device and a system for controlling a vehicle passing through an intersection.

BACKGROUND

With electronization and intellectualization of vehicles, more and more vehicles are equipped with sensors for environmental sensing and target detection, such as cameras with high-precision positioning and navigation functions and millimeter-wave radars such as a laser radar.

An advanced automatic driving vehicle is required to have an intersection passing function.

Vehicles can drive under the guide of boundaries of lane lines when running on the road. However, the vehicles cannot depend on lane lines for driving guide when passing through an intersection without lane line.

Therefore, it is desired a method to guide a vehicle to pass through an intersection.

SUMMARY

A method, a device and a system for controlling a vehicle passing through an intersection are provided, to guide a vehicle to pass through an intersection.

A method for controlling a vehicle passing through an intersection which includes generating a reference running track based on a coordinate of a first road from which the vehicle is to leave and a coordinate of a second road into which the vehicle is to enter, and the first road and the second road intersect at the intersection through which the vehicle is to pass, generating, in real time, a preview track of the vehicle based on a coordinate of a centroid of the vehicle, a course of the vehicle and the coordinate of the second road, during the vehicle passing through the intersection, comparing the preview track of the vehicle with the reference running track and acquiring a running speed limit and a turning angle of the vehicle based on the comparing, and controlling the vehicle to run at the turning angle and a running speed less than or equal to the running speed limit.

In one embodiment, generating the reference running track based on the coordinate of the first road from which the vehicle is to leave and the coordinate of the second road into which the vehicle is to enter may include
acquiring a vector of a leaving end of the first road based on a first intersection point formed by intersecting one of two lane boundaries of a lane of the first road where the vehicle is located with a stop line of the lane of the first road and a second intersection point formed by intersecting the other one of the two lane boundaries of the lane of the first road with the stop line of the lane of the first road, acquiring a vector of an entering end of the second road based on a third intersection point formed by intersecting one of two lane boundaries of a lane of the second road into which the vehicle is to enter with a stop line of the lane of the second road and a fourth intersection point formed by intersecting the other one of the two lane boundaries of the lane of the second road with the stop line of the lane of the second road, and generating the reference running track based on the vector of the leaving end of the first road and the vector of the entering end of the second road.

In one embodiment, generating, in real time, the preview track of the vehicle based on the coordinate of the centroid of the vehicle, the course of the vehicle and the coordinate of the second road may include
acquiring a vector of the course based on the centroid of the vehicle and the course of the vehicle, acquiring a vector of an entering end of the second road based on a third intersection point formed by intersecting one of two lane boundaries of a lane of the second road into which the vehicle is to enter with a stop line of the lane of the second road and a fourth intersection point formed by intersecting the other one of the two lane boundaries of the lane of the second road with the stop line of the lane of the second road, and generating the preview track of the vehicle based on the vector of the course and the vector of the entering end of the second road.

In one embodiment, before generating the reference running track, the method may further include
converting the vector of the leaving end of the first road and the vector of the entering end of the second road into a rectangular coordinate system of the intersection, and the rectangular coordinate system of the intersection is a rectangular coordinate system with a midpoint of a connection line between the first intersection point and the second intersection point as an origin, the vector of the leaving end of the first road as an x-axis, and a line perpendicular to the x-axis as a y-axis.

In one embodiment, before generating the preview track of the vehicle, the method may further include
converting the vector of the course and the vector of the entering end of the second road into a rectangular coordinate system of the intersection, and the rectangular coordinate system of the intersection is a rectangular coordinate system with a midpoint of a connection line between a first intersection point formed by intersecting one of two lane boundaries of a lane of the first road where the vehicle is located with a stop line of the lane of the first road and a second intersection point formed by intersecting the other one of the two lane boundaries of the lane of the first road with the stop line of the lane of the first road as an origin, a vector of a leaving end of the first road as an x-axis, and a line perpendicular to the x-axis as a y-axis.

In one embodiment, comparing the preview track of the vehicle with the reference running track and acquiring the running speed limit and the turning angle of the vehicle based on the comparing may include
acquiring a shortest-distance intersection point on the reference running track which has a shortest-distance to the centroid of the vehicle, calculating a distance between the shortest-distance intersection point and the centroid of the vehicle, and taking the distance as a position deviation between the centroid of the vehicle and the reference running track, acquiring a course deviation based on the vector of the course and an intersection point vector corresponding to the shortest-distance intersection point, acquiring a curvature deviation based on a turning radius of the vehicle and a curvature radius of the reference running track at the shortest-distance intersection point, acquiring the turning angle based on the position deviation, the course deviation and the curvature deviation, and acquiring the running speed limit based on the curvature radius and a preset lateral acceleration limit.

In one embodiment, acquiring the turning angle based on the position deviation, the course deviation and the curvature deviation comprises acquiring the turning angle based on the position deviation, the course deviation and the curvature deviation by the following equation:

$$\delta = K_{offset} \Delta P_v P_t + K_{azimuth} \Delta P'_t P'_v + K_{radius} \Delta R_v R_t$$

where $\Delta P_v P_t$ represents the position deviation, $\Delta P'_t P'_v$ represents the course deviation, $\Delta R_v R_t$ represents the curvature deviation, and $K_{offset}$, $K_{azimuth}$ and $K_{radius}$ represent preset weight coefficients for the position deviation, the course deviation and the curvature deviation, respectively.

In one embodiment, before acquiring the curvature deviation based on the turning radius of the vehicle and the curvature radius of the reference running track at the shortest-distance intersection point, the method may further include
acquiring the turning radius of the vehicle based on a steering wheel angle of the vehicle, a yaw rate and a speed of the vehicle.

A device for controlling a vehicle passing through an intersection is further provided in the present disclosure. The device includes
a reference running track generating unit configured to generate a reference running track based on a coordinate of a first road from which the vehicle is to leave and a coordinate of a second road into which the vehicle is to enter, and the first road and the second road intersect at the intersection through which the vehicle is to pass, a preview track generating unit configured to generate, in real time, a preview track of the vehicle based on a coordinate of a centroid of the vehicle, a course of the vehicle and the coordinate of the second road, during the vehicle passing through the intersection, an acquiring unit configured to compare the preview track of the vehicle with the reference running track and acquire a running speed limit and a turning angle of the vehicle based on the comparing, and a controlling unit configured to control the vehicle to run at the turning angle and a running speed less than or equal to the running speed limit.

In one embodiment, the reference running track generating unit may include a leaving end vector acquiring subunit configured to acquire a vector of a leaving end of the first road based on a first intersection point formed by intersecting one of two lane boundaries of a lane of the first road where the vehicle is located with a stop line of the lane of the first road and a second intersection point formed by intersecting the other one of the two lane boundaries of the lane of the first road with the stop line of the lane of the first road, an entering end vector acquiring subunit configured to acquire a vector of an entering end of the second road based on a third intersection point formed by intersecting one of two lane boundaries of a lane of the second road into which the vehicle is to enter with a stop line of the lane of the second road and a fourth intersection point formed by intersecting the other one of the two lane boundaries of the lane of the second road with the stop line of the lane of the second road, and a reference running track generating subunit configured to generate the reference running track based on the vector of the leaving end of the first road and the vector of the entering end of the second road.

In one embodiment, the preview track generating unit may include
a course vector acquiring subunit configured to acquire a vector of the course based on the centroid of the vehicle and the course of the vehicle, an entering end vector acquiring subunit configured to acquire a vector of an entering end of the second road based on a third intersection point formed by intersecting one of two lane boundaries of a lane of the second road into which the vehicle is to enter with a stop line of the lane of the second road and a fourth intersection point formed by intersecting the other one of the two lane boundaries of the lane of the second road with the stop line of the lane of the second road, and a preview track generating subunit configured to generate the preview track of the vehicle based on the vector of the course and the vector of the entering end of the second road.

In one embodiment, the device may further include
a first coordinate converting unit configured to convert the vector of the leaving end of the first road and the vector of the entering end of the second road into a rectangular coordinate system of the intersection, and the rectangular coordinate system of the intersection is a rectangular coordinate system with a midpoint of a connection line between the first intersection point and the second intersection point as an origin, the vector of the leaving end of the first road as an x-axis, and a line perpendicular to the x-axis as a y-axis.

In one embodiment, the device may further include
a second coordinate converting unit configured to convert the vector of the course and the vector of the entering end of the second road into a rectangular coordinate system of the intersection, and the rectangular coordinate system of the intersection is a rectangular coordinate system with a midpoint of a connection line between a first intersection point formed by intersecting one of two lane boundaries of a lane of the first road where the vehicle is located with a stop line of the lane of the first road and a second intersection point formed by intersecting the other one of the two lane boundaries of the lane of the first road with the stop line of the lane of the first road as an origin, a vector of a leaving end of the first road as an x-axis, and a line perpendicular to the x-axis as a y-axis.

In one embodiment, the acquiring unit may include
a position deviation acquiring subunit configured to acquire a shortest-distance intersection point on the reference running track which has a shortest-distance to the centroid of the vehicle, calculate a distance between the shortest-distance intersection point and the centroid of the vehicle, and take the distance as a position deviation between the centroid of the vehicle and the reference running track, a course deviation acquiring subunit configured to acquire a course deviation based on the vector of the course and an intersection point vector corresponding to the shortest-distance intersection point, a curvature deviation acquiring subunit configured to acquire a curvature deviation based on a turning radius of the vehicle and a curvature radius of the reference running track at the shortest-distance intersection point, a turning angle acquiring subunit configured to acquire the turning angle based on the position deviation, the course deviation and the curvature deviation, and a running speed limit acquiring subunit configured to acquire the running speed limit based on the curvature radius and a preset lateral acceleration limit.

There is further provided in the present disclosure an intelligent driving system applied to an intelligent driving vehicle. The system includes a camera configured to take a photograph or a video of an intersection, and a vehicle controller configured to acquire, based on the photograph or the video of the intersection taken by the camera, a coordinate of a first road from which a vehicle is to leave and a coordinate of a second road into which the vehicle is to enter, and generate a reference running track based on the coordinate of the first road and the coordinate of the second road, and the first road and the second road intersect at the intersection through which the vehicle is to pass, generate, in real time, a preview track of the vehicle based on a coordinate of a centroid of the vehicle, a course of the vehicle and the coordinate of the second road, during the vehicle passing through the intersection, compare the preview track of the vehicle with the reference running track and acquire a running speed limit and a turning angle of the vehicle based on the comparing; and control the vehicle to run at the turning angle and a running speed less than or equal to the running speed limit.

There is further provided in the present disclosure a computer readable storage medium on which a computer program is stored, and the computer program, when executed by a processor, causes the processer to generate a reference running track based on a coordinate of a first road from which the vehicle is to leave and a coordinate of a second road into which the vehicle is to enter, and the first road and the second road intersect at the intersection through which the vehicle is to pass, generate, in real time, a preview track of the vehicle based on a coordinate of a centroid of the vehicle, a course of the vehicle and the coordinate of the second road, during the vehicle passing through the intersection, compare the preview track of the vehicle with the reference running track and acquire a running speed limit and a turning angle of the vehicle based on the comparing, and control the vehicle to run at the turning angle and a running speed less than or equal to the running speed limit.

A reference running track is generated based on a coordinate of a first road from which the vehicle is to leave and a coordinate of a second road into which the vehicle is to enter, a preview track of the vehicle is generated in real time based on a coordinate of a centroid of the vehicle, a course of the vehicle and the coordinate of the second road, a running speed limit and a turning angle of the vehicle are acquired by comparing the preview track of the vehicle with the reference running track, and the vehicle is controlled to run at the turning angle and a running speed less than or equal to the running speed limit, so that the deviation between the track of the vehicle in the actual running process and the reference running track is as small as possible, and the vehicle passes through the intersection without lane line under the guidance of the reference running track, thereby ensuring driving safety and reducing traffic accidents.

BRIEF DESCRIPTION OF THE DRAWINGS

In order to more clearly illustrate embodiments of the present disclosure or technical solutions, the drawings, which are used in the description of the embodiments, are briefly described below. It is apparent that, the drawings in the following description show only some embodiments of the present disclosure.

DETAILED DESCRIPTION OF EMBODIMENTS

Technical solutions in embodiments of the present disclosure are described below in connection with drawings in the embodiments of the present disclosure. It is apparent that the embodiments described below are only some embodiments of the present disclosure, rather than all of embodiments.

The technical solutions of the present disclosure are described below in some application scenarios. For example, one of the application scenarios of the embodiments of the present disclosure is a vehicle passing through an intersection without lane line, and a reference running track is generated to guide the vehicle to run according to the control method provided in the present disclosure, so that the vehicle can safely pass through the intersection without lane line.

The vehicle may be an unmanned vehicle, or a manned vehicle in an automatic driving state.

The lane line may be a traffic marking line for distinguishing lanes or indicating a driving direction or a driving speed, such as a stop line, a boundary line of a lane or a crosswalk line.

The intersection may be a five-way intersection, a crossroad, a T-shaped intersection or an L-shaped intersection.

For example, in a case that an unmanned vehicle is to pass through a crossroad and turn left, the unmanned vehicle may not smoothly pass through the crossroad since the lane line does not extend into the crossroad and there is no other lane line indicating a driving direction at the crossroad. In this case, a reference running track is generated for the unmanned vehicle according to the method of the present disclosure, so that the unmanned vehicle can safely pass through the crossroad based on the reference running track.

Figure 1:
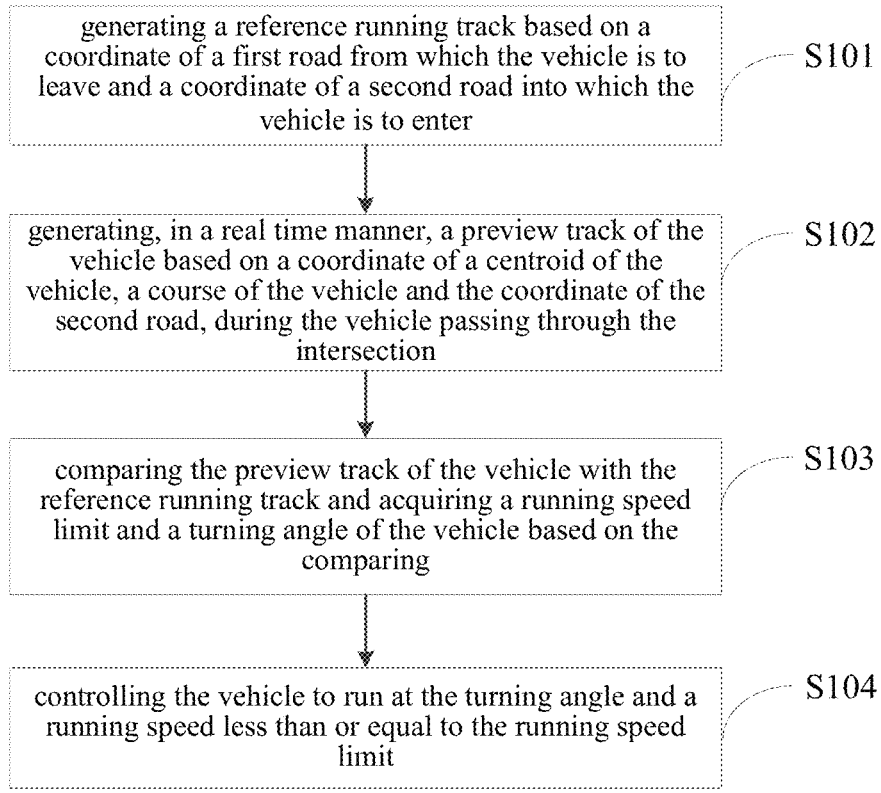
FIG. 1 is a flowchart of a method for controlling a vehicle passing through an intersection according to an embodiment of the present disclosure.

Reference is made to FIG. 1, which is a flowchart of a method for controlling a vehicle passing through an intersection according to an embodiment of the present disclosure.

The method for controlling a vehicle passing through an intersection according to the embodiment may include the following S101 to S104.

In S101, a reference running track is generated based on a coordinate of a first road from which the vehicle is to leave and a coordinate of a second road into which the vehicle is to enter.

A road from which the vehicle is to leave is referred to as the first road, and a road into which the vehicle is to enter is referred to as the second road.

The coordinate of the first road and the coordinate of the second road may be acquired by a camera on the vehicle. The camera may acquire an image or a video of the intersection and analyze the image or video of the intersection to obtain the coordinate of first road and the coordinate of the second road in a camera coordinate system.

In S102, a preview track of the vehicle is generated in real time based on a coordinate of a centroid of the vehicle, a course of the vehicle and the coordinate of the second road, during the vehicle passing through the intersection.

When passing through the intersection, the vehicle needs to avoid pedestrians and other vehicles at the intersection, and the vehicle may deviate from its track during the driving, these may cause the vehicle to deviate from the reference running track. In this case, a preview track of the vehicle is generated in real time based on a coordinate of a centroid of the vehicle, a course of the vehicle and the coordinate of the second road.

In S103, the preview track of the vehicle is compared with the reference running track and a running speed limit and a turning angle of the vehicle are acquired based on the comparing.

Since the preview track of the vehicle may be different from the reference running track, the preview track of the vehicle is compared with the reference running track, a running speed limit and a turning angle of the vehicle are acquired based on the comparing, and a running speed and a running direction of the vehicle are adjusted based on the running speed limit and the turning angle.

The running speed limit is to limit the speed of the vehicle during a process of entering into the second road from the first road. If the speed of the vehicle exceeds the running speed limit, the vehicle may not smoothly pass through the intersection, or even a traffic accident may occur.

In S104, the vehicle is controlled to run toward the second road at the turning angle and a running speed less than or equal to the running speed limit.

After the running speed limit and the turning angle are determined, the vehicle is controlled to pass through the intersection at the turning angle and the speed of the vehicle is maintained not to exceed the running speed limit, so that the preview track of the vehicle is as close to the reference running track as possible.

With the method according to the present embodiment, a reference running track is generated based on a coordinate of a first road from which the vehicle is to leave and a coordinate of a second road into which the vehicle is to enter, a preview track of the vehicle is generated in real time based on a coordinate of a centroid of the vehicle, a course of the vehicle and the coordinate of the second road, a running speed limit and a turning angle of the vehicle are acquired by comparing the preview track of the vehicle with the reference running track, and the vehicle is controlled to run at the turning angle and a running speed less than or equal to the running speed limit, so that the deviation between the track of the vehicle in the actual running process and the reference running track is as small as possible, and the vehicle passes through the intersection without lane line under the guidance of the reference running track, thereby ensuring driving safety and reducing traffic accidents.

A method of generating a reference running track is described below.

Figure 2:
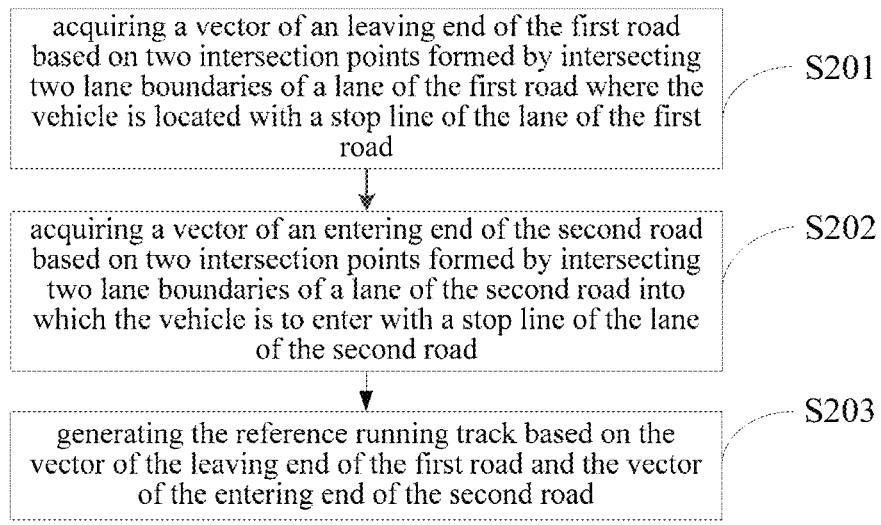
FIG. 2 is a flowchart of a process of generating a reference running track according to an embodiment of the present disclosure.

Reference is made to FIG. 2, which is a flowchart of a process for generating a reference running track according to an embodiment of the present disclosure.

In this embodiment, the process of generating the reference running track based on the coordinate of the first road from which the vehicle is to leave and the coordinate of the second road into which the vehicle is to enter may include the following S201 to S203.

In S201, a vector of a leaving end of the first road is acquired based on a first intersection point formed by intersecting one of two lane boundaries of a lane of the first road where the vehicle is located with a stop line of the lane of the first road and a second intersection point formed by intersecting the other one of the two lane boundaries of the lane of the first road with the stop line of the lane of the first road.

In S202, a vector of an entering end of the second road is acquired based on a third intersection point formed by intersecting one of two lane boundaries of a lane of the second road into which the vehicle is to enter with a stop line of the lane of the second road and a fourth intersection point formed by intersecting the other one of the two lane boundaries of the lane of the second road with the stop line of the lane of the second road.

It should be noted that the order of performing S201 and S202 is not limited.

In S203, the reference running track is generated based on the vector of the leaving end of the first road and the vector of the entering end of the second road.

An implementation for generating a reference running track is described in detail below in connection with the drawings.

Figure 3:
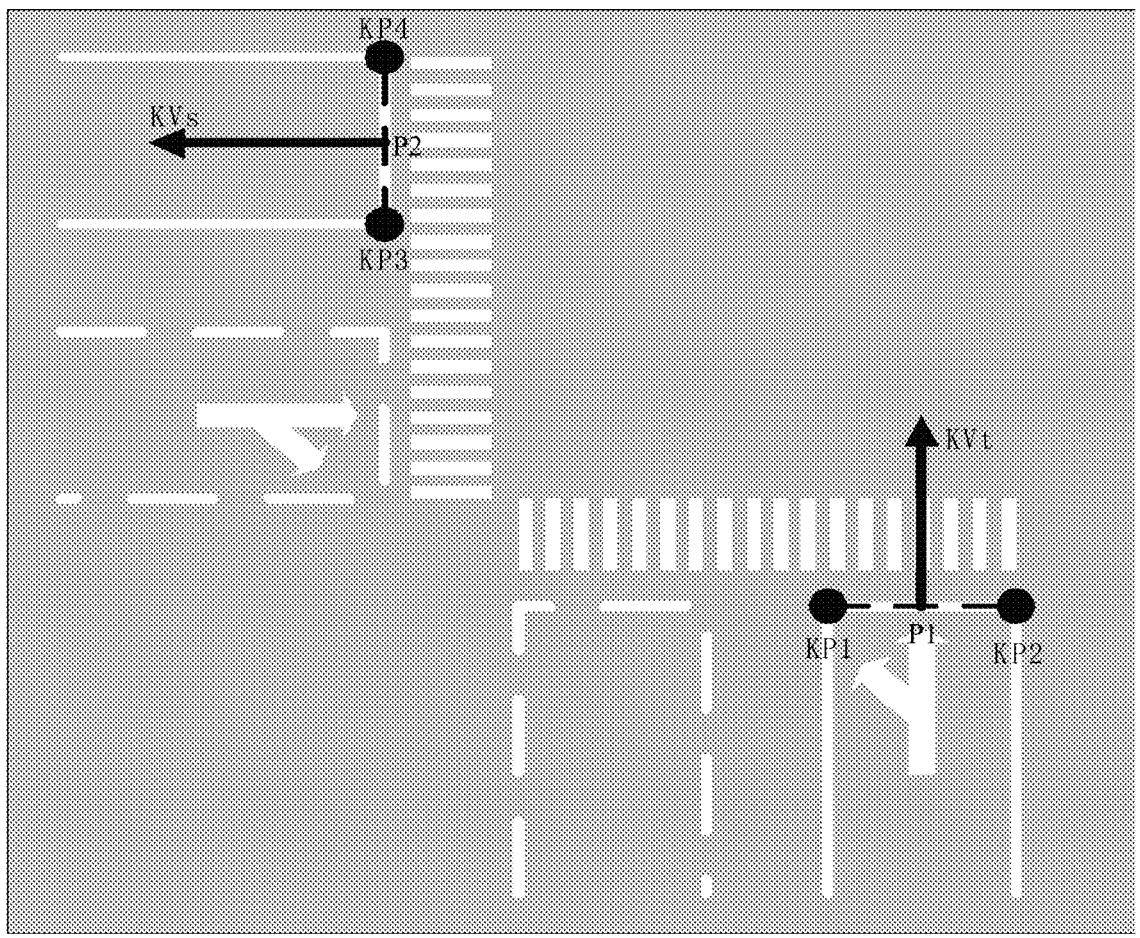
FIG. 3 is a schematic diagram of an intersection according to an embodiment of the present disclosure.

Reference is made to FIG. 3, which is a schematic diagram of an intersection according to an embodiment of the present disclosure.

As shown in FIG. 3, the first road and the second road corresponding to the intersection are perpendicular to each other.

In some other cases, the first road and the second road of an intersection are not perpendicular to each other, such as a T-shaped intersection and a five-way intersection. The method according to the embodiment of the present disclosure can also be applied to these scenarios.

Coordinates of two intersection points, i.e., a first intersection point KP1 and a second intersection point KP2, formed by intersecting two lane boundaries of a lane of the first road where the vehicle is located with a stop line of the lane of the first road, are acquired. Coordinates of two intersection points, i.e., a third intersection point KP3 and a fourth intersection point KP4, formed by intersecting two lane boundaries of a lane of the second road into which the vehicle is to enter with a stop line of the lane of the second road, are acquired.

A vector KVt of the leaving end of the first road is acquired based on the first intersection point KP1 and the second intersection point KP2. The vector KVt of the leaving end of the first road is a vector which is taken a midpoint P1 of a connection line of the first intersection point KP1 and the second intersection point KP2 as a start point, is perpendicular to the connection line of the first intersection point KP1 and the second intersection point KP2, and is in a direction the same as the running direction of the vehicle.

A vector KVs of the entering end of the second road is acquired based on the third intersection point KP3 and the fourth intersection point KP4. The vector KVs of the entering end of the second road is a vector which is taken a midpoint P2 of a connection line of the third intersection point KP3 and the fourth intersection point KP4 as a start point, is perpendicular to the connection line of the third intersection point KP3 and the fourth intersection point KP4, and is in a direction the same as the running direction of the vehicle.

It should be noted that, only an example of an intersection is illustrated in FIG. 3, and an implementation of acquiring vectors of two roads merged at an intersection based on coordinates of the two roads is described in the above embodiment. The two roads merged at the intersection may or may not be perpendicular to each other, and the method according to the above embodiment can be applied to both the two scenarios. A scenario that two roads are perpendicular to each other is shown in FIG. 3, and a method of generating a reference running track in a scenario where two roads are not perpendicular to each other is described below. The method described below is also applied to the scenario where two roads are perpendicular to each other.

Figure 4:
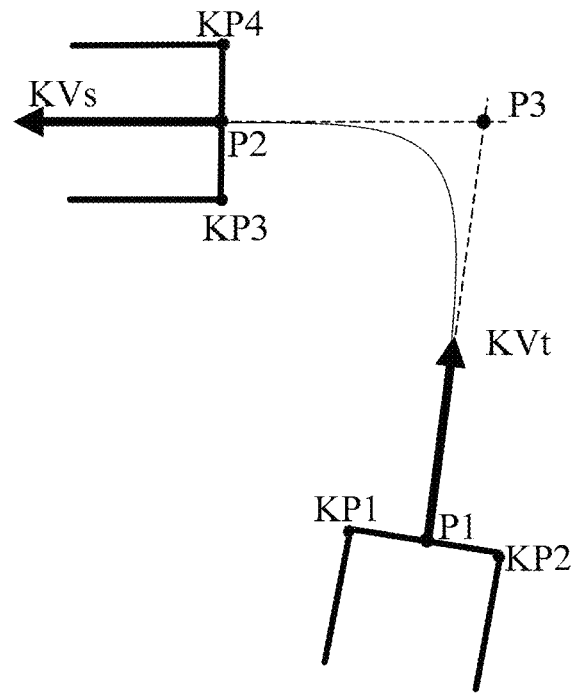
FIG. 4 is a schematic diagram of another intersection according to an embodiment of the present disclosure.

Reference is made to FIG. 4, which is a schematic diagram of another intersection according to an embodiment of the present disclosure.

The process of generating the reference running track based on the vector KVt of the leaving end of the first road and the vector KVs of the entering end of the second road may include:

acquiring an intersection point of the vector KVt of the leaving end of the first road with the vector KVs of the entering end of the second road as a first cross point P3; and generating the reference running track based on a start point of the vector KVt of the leaving end of the first road, a start point of the vector KVs of the entering end of the second road, and the first cross point P3.

As shown in FIG. 4, the first cross point P3 is an intersection point of the vector KVt of the leaving end of the first road and a reverse extension line of the vector KVs of the entering end of the second road.

A curve fitting method may be adopted to generate the reference running track. A cubic Hermite spline curve may be utilized in this embodiment.

A cubic Hermite spline curve PA for the reference running track may be expressed by the following equation:

$$PA = P1(1-3t^2+2t^3) + P2(3t^2-2t^3) + P'_1(t-2t^2+t^3) + P'_2(-t^2+t^3)$$

where P1 represents a coordinate of a point P1, P2 represents a coordinate of a point P2, $P'_1 = \overline{P1P3}$, $P'_2 = \overline{P2P3}$, and t is an independent variable which may be in a range of $t \in [0,1]$.

In addition, the reference running track may be generated in other curve fitting manners except to the cubic Hermite spline curve.

It should be noted that, a scenario where a vehicle turns left when passing through an intersection is described in FIGS. 3 and 4, and the vehicle may also turn right or go straight when passing through an intersection, which is not described in detail herein. In all of these cases, the vehicle can be controlled according to the control method in the above embodiments.

In order to reduce operation complexity and improve operation efficiency in generating the reference running track, the midpoint of the connection line of the first intersection point and the second intersection point, the midpoint of the connection line of the third intersection point and the fourth intersection point, and the first cross point may be converted into a rectangular coordinate system of the intersection, and the reference running track is generated based on the converted midpoint of the connection line of the first intersection point and the second intersection point, the converted midpoint of the connection line of the third intersection point and the fourth intersection point, and the converted first cross point.

Figure 5:
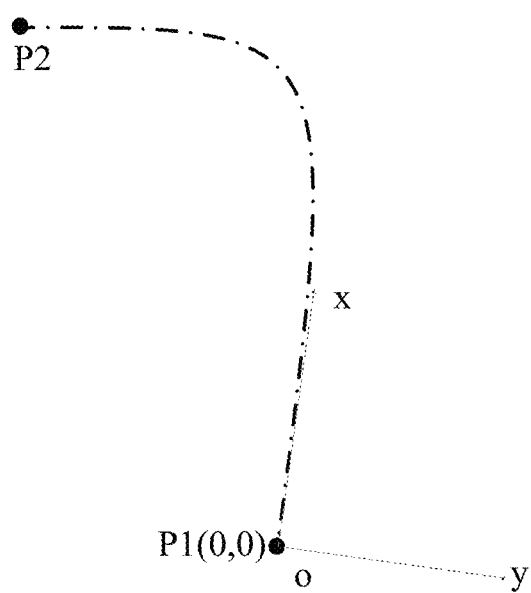
FIG. 5 is a schematic diagram of a rectangular coordinate system of an intersection according to an embodiment of the present disclosure.

Reference is made to FIG. 5, which is a schematic diagram of a rectangular coordinate system of an intersection according to an embodiment of the present disclosure.

An implementation of a rectangular coordinate system of an intersection is shown in FIG. 5 according to an embodiment.

In the rectangular coordinate system of the intersection, an origin is a midpoint P1 of a connection line of the first intersection point and the second intersection point, an x-axis is the vector of the leaving end of the first road, and a y-axis is perpendicular to the x-axis.

Since P1 is the origin, a coordinate of P1 is (0, 0).

A method for generating a reference running track is described in the above embodiment, and the principle of generating a preview track of the vehicle is the same as that of generating the reference running track. A method for generating a preview track of a vehicle is described in detail below in connection with the drawings.

Figure 6:
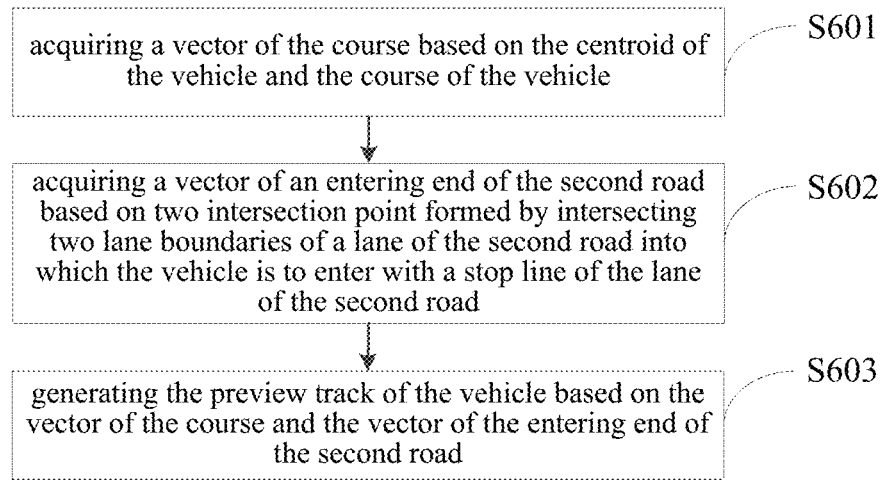
FIG. 6 is a flowchart of a process of generating a preview track of a vehicle according to an embodiment of the present disclosure.

Reference is made to FIG. 6, which is a flowchart of a process for generating a preview track of a vehicle according to an embodiment of the present disclosure.

The method for generating a preview track of a vehicle according to the present embodiment may include the following S601 to S603.

In S601, a vector of the course is acquired based on the centroid of the vehicle and the course of the vehicle.

In S602, a vector of the entering end of the second road is acquired based on two intersection points formed by intersecting two lane boundaries of a lane of the second road into which the vehicle is to enter with a stop line of the lane of the second road.

A method for acquiring the vector of the entering end of the second road may refer to the embodiment corresponding to FIG. 3, which is not repeated herein.

In S603, a preview track of the vehicle is generated based on the vector of the course and the vector of the entering end of the second road.

Figure 7:
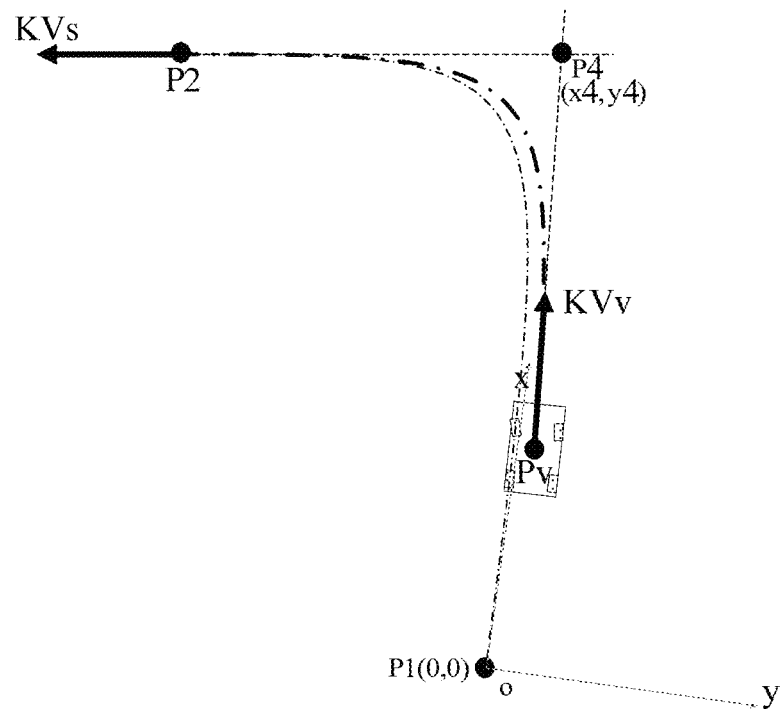
FIG. 7 is a schematic diagram of a vector of a course according to an embodiment of the present disclosure.

A method for acquiring a vector of the course is described below in connection with the drawings. Reference is made to FIG. 7, which is a schematic diagram of a vector of the course according to an embodiment of the present disclosure.

A vector KVv of the course is a vector which extends from a centroid Pv of the vehicle as a start point in a course direction of the vehicle.

The process of generating the preview track of the vehicle based on the vector KVv of the course and the vector KVs of the entering end of the second road may include:

acquiring an intersection point of the vector KVv of the course and the vector KVs of the entering end of the second road, and taking the intersection point as a second cross point P4; and generating the preview track of the vehicle based on the start point Pv of the vector KVv of the course, the start point P2 of the vector KVs of the entering end of the second road and the second cross point P4.

As shown in FIG. 7, the second cross point P4 is an intersection point of the vector KVv of the course and a reverse extension line of the vector KVs of the entering end of the second road, and a coordinate of P4 is (x4, y4).

The curve fitting method may be adopted to generate the preview track of the vehicle. A cubic Hermite spline curve may be utilized in this embodiment.

A cubic Hermite spline curve PB may be expressed by the following equation:

$$PB=Pv(1-3t^2+2t^3)+P2(3t^2-2t^3)+P'_3(t-2t^2+t^3)+P'_4(-t^2+t^3)$$

where Pv represents a coordinate of point Pv, P2 represents a coordinate of point P2, $P'_1=\overline{PvP4}$, $P'_4=\overline{P2P4}$, and t is an independent variable which may be in a range of $t\in[0,1]$.

In addition, the preview track of the vehicle may be generated in other curve fitting manners except to the cubic Hermite spline curve.

It should be noted that, in order to reduce operation complexity and improve operation efficiency in generating the preview track of the vehicle, coordinates of points Pv, P4 and P2 may be converted into a rectangular coordinate system of the intersection, and a preview track of the vehicle may be generated based on the converted points Pv, P4 and P2, which is similar to the reference running track generating process.

In order to reduce operation complexity and improve operation efficiency, a rectangular coordinate system of an intersection is constructed in the embodiment. In acquiring the reference running track and the preview track of the vehicle, related points are converted into the rectangular coordinate system. A running speed limit and a turning angle of the vehicle are acquired by comparing the preview track of the vehicle with the reference running track, and the vehicle is controlled to run at the turning angle and a running speed less than or equal to the running speed limit, so that the deviation between the track of the vehicle in the actual running process and the reference running track is as small as possible, and the vehicle passes through the intersection without lane line under the guidance of the reference running track, thereby ensuring driving safety and reducing traffic accidents.

A method of comparing the preview track of the vehicle with the reference running track and acquiring the running speed limit and the turning angle of the vehicle based on the comparing is described in detail below in connection with the drawings.

Figure 8:
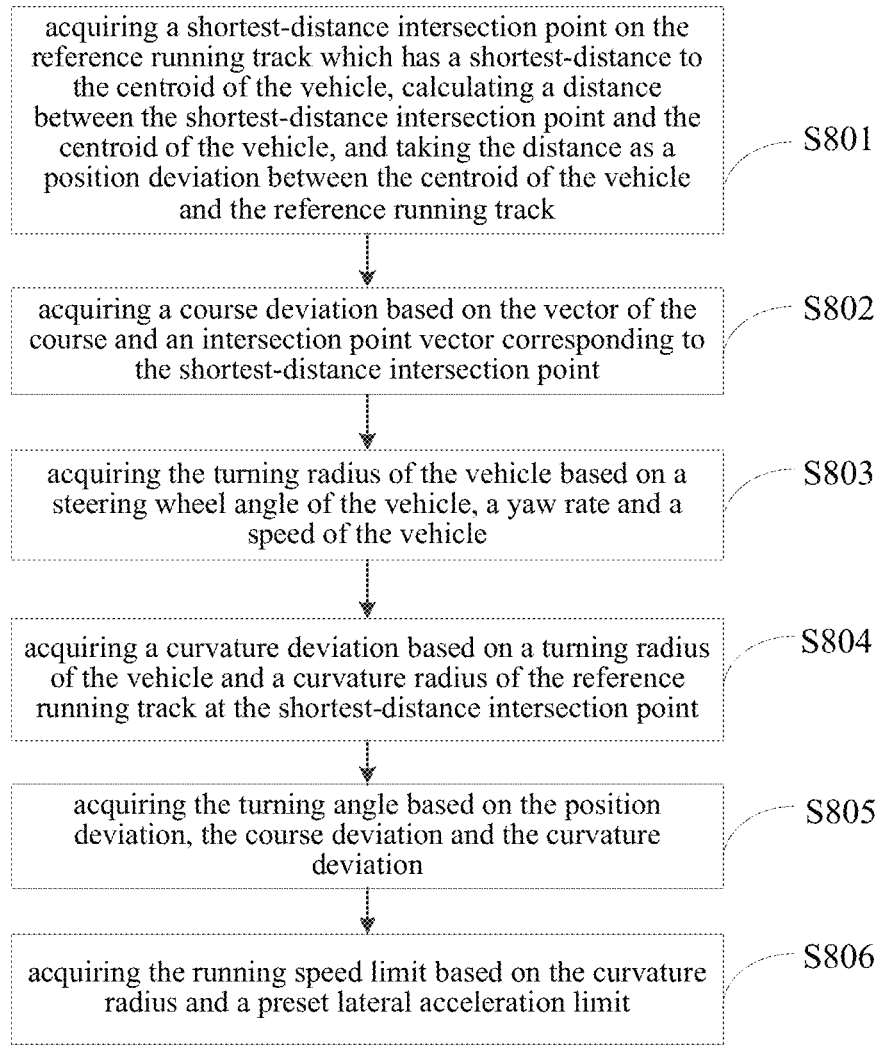
FIG. 8 is a flowchart of a process of calculating a running speed limit and a turning angle according to an embodiment of the present disclosure.

Reference is made to FIG. 8, which is a flowchart of a process for calculating a running speed limit and a turning angle according to an embodiment of the present disclosure.

The method for calculating the running speed limit and the turning angle according to the present embodiment may include the following S801 to S806.

In S801, a shortest-distance intersection point on the reference running track which has a shortest-distance to the centroid of the vehicle is acquired, a distance between the shortest-distance intersection point and the centroid of the vehicle is calculated, and the distance is taken as a position deviation between the centroid of the vehicle and the reference running track.

In S802, a course deviation is acquired based on the vector of the course and an intersection point vector corresponding to the shortest-distance intersection point.

The course deviation is an angle difference between the vector of the course and the intersection point vector corresponding to the shortest-distance intersection point, i.e., an included angle between the vector of the course and the intersection point vector.

In S803, a turning radius of the vehicle is acquired based on a steering wheel angle of the vehicle, a yaw rate and a speed of the vehicle.

In S804, a curvature deviation is acquired based on the turning radius of the vehicle and a curvature radius of the reference running track at the shortest-distance intersection point.

The curvature deviation is a difference between the turning radius of the vehicle and the curvature radius of the reference running track at the shortest-distance intersection point.

In S805, a turning angle is acquired based on the position deviation, the course deviation and the curvature deviation.

A turning angle δ may be calculated by the following equation:

$$\delta=K_{offset}\Delta P_vP_t+K_{azimuth}\Delta P'_tP'_v+K_{radius}\Delta R_vR_t$$

where $\Delta P_vP_t$ represents the position deviation, $\Delta P'_tP'_v$ represents the course deviation, $\Delta R_vR_t$ represents the curvature deviation, and $K_{offset}$, $K_{azimuth}$ and $K_{radius}$ represent preset weight coefficients for the position deviation, the course deviation and the curvature deviation, respectively. The weight coefficients may be set according to actual scenarios and parameters of the vehicle itself, which are not limited herein.

In S806, a running speed limit is acquired based on the curvature radius and a preset lateral acceleration limit. The preset lateral acceleration limit is an acceleration limit in a direction perpendicular to the running direction of the vehicle.

The acceleration limit is an absolute value and is a positive number.

The running speed limit may be acquired based on the curvature radius and the preset lateral acceleration limit by the following formula:

$$V_{lim}\sqrt{R_ta_{ylim}}$$

where $V_{lim}$ represents the preset lateral acceleration limit, and $R_t$ represents the curvature radius.

An implementation for acquiring the shortest-distance intersection point is described below in connection with FIG. 9.

Figure 9:
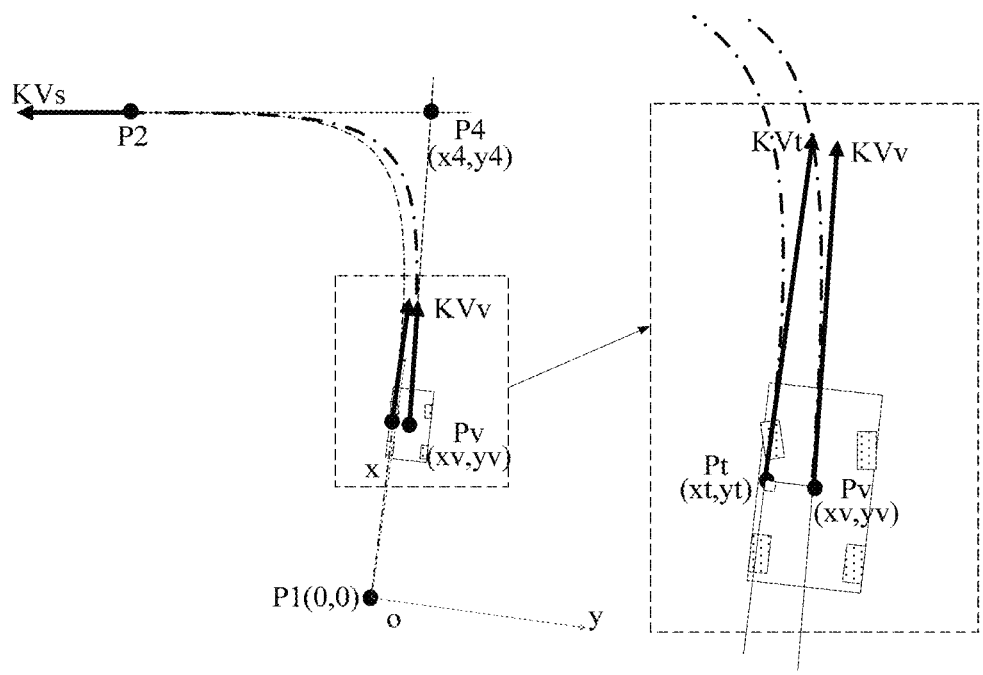
FIG. 9 is a schematic diagram of a shortest-distance intersection point according to an embodiment of the present disclosure.

Reference is made to FIG. 9, which is a schematic diagram of a shortest-distance intersection point according to an embodiment of the present disclosure.

The shortest-distance intersection point Pt is a point on the reference running track which has the shortest distance from the centroid Pv of the vehicle, that is, a connection line of the shortest-distance intersection point Pt and the centroid Pv of the vehicle is perpendicular to a tangent of the reference running track at the shortest-distance intersection point.

An implementation of acquiring the shortest-distance intersection point may be:

acquiring a shortest distance from the centroid of the vehicle to the reference running track. That is, a shortest distance from a point to a line is calculated. A point on the reference running track corresponding to the shortest distance is referred to as a shortest-distance intersection point.

The position deviation is a distance between the shortest-distance intersection point Pt and the centroid Pv of the vehicle. That is, a distance between two points is calculated.

A possible method for calculating a running speed limit and a turning angle is provided according to the present embodiment. A reference running track is generated based on a coordinate of a first road from which the vehicle is to leave and a coordinate of a second road into which the vehicle is to enter, a preview track of the vehicle is generated in real time based on a coordinate of a centroid of the vehicle, a course of the vehicle and the coordinate of the second road, a running speed limit and a turning angle of the vehicle are acquired by comparing the preview track of the vehicle with the reference running track, and the vehicle is controlled to run at the turning angle and a running speed less than or equal to the running speed limit, so that the deviation between the track of the vehicle in the actual running process and the reference running track is as small as possible, and the vehicle passes through the intersection without lane line under the guidance of the reference running track, thereby ensuring driving safety and reducing traffic accidents.

Based on the method for controlling a vehicle passing through an intersection according to the above embodiments, a device for controlling a vehicle passing through an intersection is further provided according to an embodiment of the present disclosure, and an operation principle thereof is described below in detail in connection with the drawings.

Figure 10:
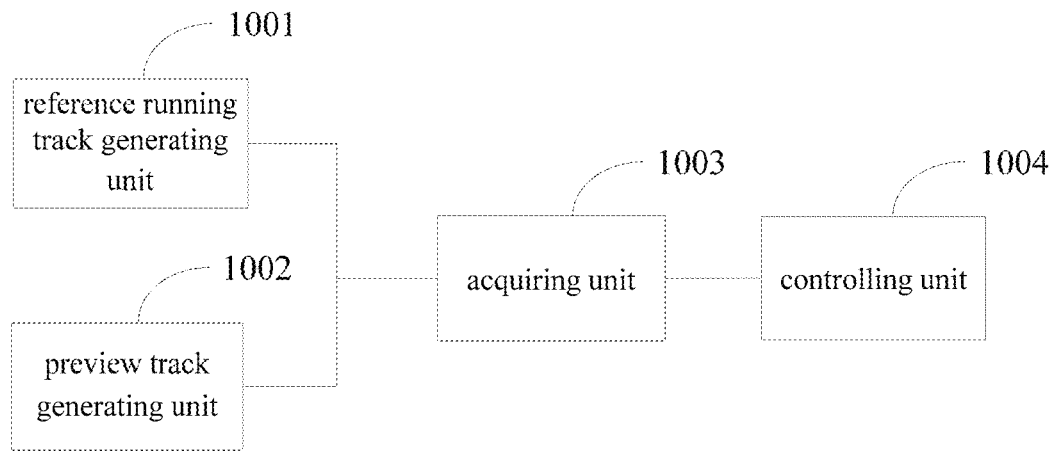
FIG. 10 is a block diagram of a structure of a device for controlling a vehicle passing through an intersection according to an embodiment of the present disclosure.

Reference is made to FIG. 10, which is a block diagram of a structure of a device for controlling a vehicle passing through an intersection according to an embodiment of the present disclosure.

The device for controlling a vehicle passing through an intersection according to the present embodiment may include a reference running track generating unit 1001, a preview track generating unit 1002, an acquiring unit 1003 and a controlling unit 1004.

The reference running track generating unit 1001 is configured to generate a reference running track based on a coordinate of a first road from which the vehicle is to leave and a coordinate of a second road into which the vehicle is to enter, and the first road and the second road intersect at the intersection through which the vehicle is to pass.

The preview track generating unit 1002 is configured to generate, in real time, a preview track of the vehicle based on a coordinate of a centroid of the vehicle, a course of the vehicle and the coordinate of the second road, during the vehicle passing through the intersection.

The acquiring unit 1003 is configured to compare the preview track of the vehicle with the reference running track and acquire a running speed limit and a turning angle of the vehicle based on the comparing.

The controlling unit 1004 is configured to control the vehicle to run at the turning angle and a running speed less than or equal to the running speed limit.

With the device for controlling a vehicle passing through an intersection according to the present embodiment, the reference running track generating unit 1001 generates a reference running track based on a coordinate of a first road from which the vehicle is to leave and a coordinate of a second road into which the vehicle is to enter, the preview track generating unit 1002 generates a preview track of the vehicle in real time based on a coordinate of a centroid of the vehicle, a course of the vehicle and the coordinate of the second road, the acquiring unit 1003 acquires a running speed limit and a turning angle of the vehicle by comparing the preview track of the vehicle with the reference running track, and the controlling unit 1004 controls the vehicle to run at the turning angle and a running speed less than or equal to the running speed limit, so that the deviation between the track of the vehicle in the actual running process and the reference running track is as small as possible, and the vehicle passes through the intersection without lane line under the guidance of the reference running track, thereby ensuring driving safety and reducing traffic accidents.

A configuration of the reference running track generating unit is described below in connection with the drawings.

Figure 11:
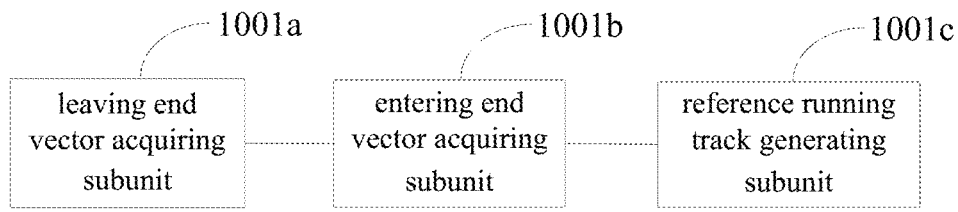
FIG. 11 is a block diagram of a structure of a reference running track generating unit according to an embodiment of the present disclosure.

Reference is made to FIG. 11, which is a block diagram of a structure of a reference running track generating unit according to an embodiment of the present disclosure.

The reference running track generating unit 1001 according to the present embodiment may include a leaving end vector acquiring subunit 1001a, an entering end vector acquiring subunit 1001b and a reference running track generating subunit 1001c.

The leaving end vector acquiring subunit 1001a is configured to acquire a vector of a leaving end of the first road based on a first intersection point formed by intersecting one of two lane boundaries of a lane of the first road where the vehicle is located with a stop line of the lane of the first road and a second intersection point formed by intersecting the other one of the two lane boundaries of the lane of the first road with the stop line of the lane of the first road.

The entering end vector acquiring subunit 1001b configured to acquire a vector of an entering end of the second road based on a third intersection point formed by intersecting one of two lane boundaries of a lane of the second road into which the vehicle is to enter with a stop line of the lane of the second road and a fourth intersection point formed by intersecting the other one of the two lane boundaries of the lane of the second road with the stop line of the lane of the second road.

The reference running track generating subunit 1001c is configured to generate the reference running track based on the vector of the leaving end of the first road and the vector of the entering end of the second road.

A configuration of a preview track generating unit is described below in connection with the drawings.

Figure 12:
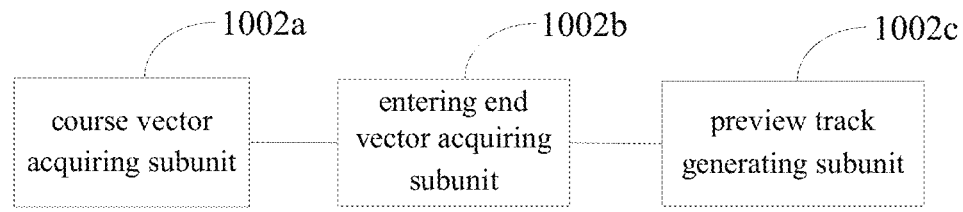
FIG. 12 is a block diagram of a structure of a preview track generating unit according to an embodiment of the present disclosure.

Reference is made to FIG. 12, which is a block diagram of a structure of a preview track generating unit according to an embodiment of the present disclosure.

The preview track generating unit 1002 according to the present embodiment may include a course vector acquiring subunit 1002a, an entering end vector acquiring subunit 1002b and a preview track generating subunit 1002c.

The course vector acquiring subunit 1002a is configured to acquire a vector of the course based on the centroid of the vehicle and the course of the vehicle.

The entering end vector acquiring subunit 1002b is configured to acquire a vector of an entering end of the second road based on a third intersection point formed by intersecting one of two lane boundaries of a lane of the second road into which the vehicle is to enter with a stop line of the lane of the second road and a fourth intersection point formed by intersecting the other one of the two lane boundaries of the lane of the second road with the stop line of the lane of the second road.

The preview track generating subunit 1002c is configured to generate the preview track of the vehicle based on the vector of the course and the vector of the entering end of the second road.

A configuration of the acquiring unit is described below in connection with the drawings.

Figure 13:
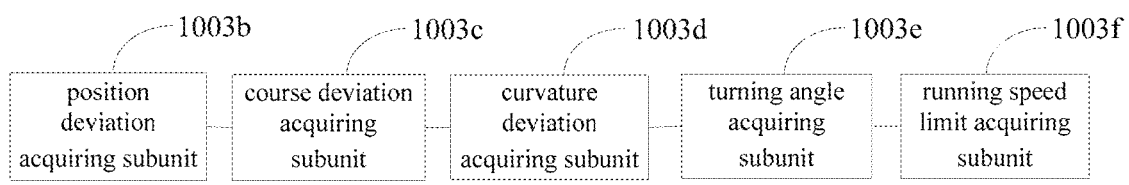
FIG. 13 is a block diagram of a structure of an acquiring unit according to an embodiment of the present disclosure.

Reference is made to FIG. 13, which is a block diagram of a structure of an acquiring unit according to an embodiment of the present disclosure.

The acquiring unit 1003 according to the present embodiment may include a position deviation acquiring subunit 1003b, a course deviation acquiring subunit 1003c, a curvature deviation acquiring subunit 1003d, a turning angle acquiring subunit 1003e and a running speed limit acquiring subunit 1003f.

The position deviation acquiring subunit 1003b is configured to acquire a shortest-distance intersection point on the reference running track which has a shortest-distance to the centroid of the vehicle, calculate a distance between the shortest-distance intersection point and the centroid of the vehicle, and take the distance as a position deviation between the centroid of the vehicle and the reference running track.

The course deviation acquiring subunit 1003c is configured to acquire a course deviation based on the vector of the course and an intersection point vector corresponding to the shortest-distance intersection point.

The curvature deviation acquiring subunit 1003d is configured to acquire a curvature deviation based on a turning radius of the vehicle and a curvature radius of the reference running track at the shortest-distance intersection point.

The turning angle acquiring subunit 1003e is configured to acquire the turning angle based on the position deviation, the course deviation and the curvature deviation.

The running speed limit acquiring subunit 1003f is configured to acquire the running speed limit based on the curvature radius and a preset lateral acceleration limit.

In order to reduce operation complexity and improve operation efficiency, the device according to the embodiment of the present disclosure may further include a first coordinate converting unit configured to convert coordinates into a rectangular coordinate system of an intersection before performing calculation.

Figure 14:
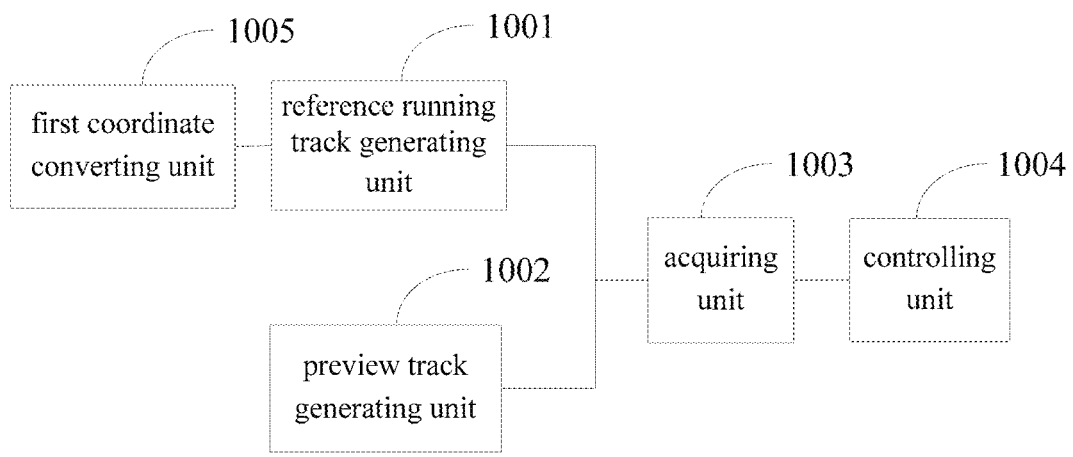
FIG. 14 is a block diagram of a structure of another device for controlling a vehicle passing through an intersection according to an embodiment of the present disclosure.

Reference is made to FIG. 14, which is a block diagram of a structure of another device for controlling a vehicle passing through an intersection according to an embodiment of the present disclosure.

The device for controlling a vehicle passing through an intersection according to the present embodiment may further include a first coordinate converting unit 1005.

The first coordinate converting unit 1005 is configured to convert the vector of the leaving end of the first road and the vector of the entering end of the second road into a rectangular coordinate system of the intersection.

The rectangular coordinate system of the intersection is a rectangular coordinate system with a midpoint of a connection line between the first intersection point and the second intersection point as an origin, the vector of the leaving end of the first road as an x-axis, and a line perpendicular to the x-axis as a y-axis.

The reference running track generating unit 1001 is further configured to generate the reference running track based on the converted vector of the leaving end of the first road and the converted vector of the entering end of the second road.

Similarly, the device may further include a second coordinate converting unit.

Figure 15:
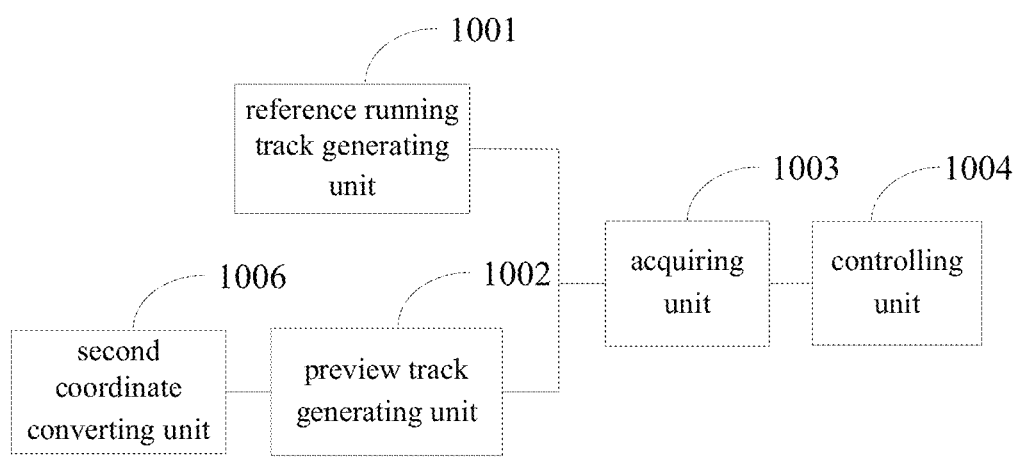
FIG. 15 is a block diagram of a structure of another device for controlling a vehicle passing through an intersection according to an embodiment of the present disclosure.

Reference is made to FIG. 15, which is a block diagram of a structure of another device for controlling a vehicle passing through an intersection according to an embodiment of the present disclosure.

The device for controlling a vehicle passing through an intersection according to the present embodiment may further include a second coordinate converting unit 1006.

The second coordinate converting unit 1006 is configured to convert the vector of the course and the vector of the entering end of the second road into a rectangular coordinate system of the intersection.

The rectangular coordinate system of the intersection is a rectangular coordinate system with a midpoint of a connection line between a first intersection point formed by intersecting one of two lane boundaries of a lane of the first road where the vehicle is located with a stop line of the lane of the first road and a second intersection point formed by intersecting the other one of the two lane boundaries of the lane of the first road with the stop line of the lane of the first road as an origin, a vector of a leaving end of the first road as an x-axis, and a line perpendicular to the x-axis as a y-axis.

The preview track generating unit 1002 is further configured to generate a preview track of the vehicle based on the converted vector of the course and the converted vector of the entering end of the second road.

Based on the method and the device for controlling a vehicle passing through an intersection according to the above embodiments, an intelligent driving system is further provided according to an embodiment of the present disclosure, and an operation principle thereof is described below in detail in connection with the drawings.

Figure 16:
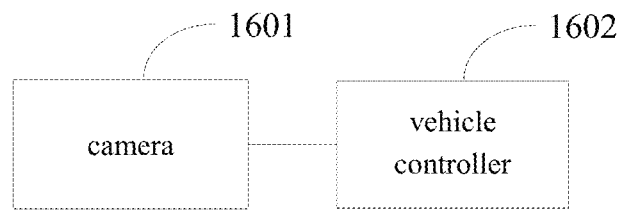
FIG. 16 is a block diagram of a structure of an intelligent driving system according to an embodiment of the present disclosure.

Reference is made to FIG. 16, which is a block diagram of a structure of an intelligent driving system according to an embodiment of the present disclosure.

The intelligent driving system according to the present embodiment is applied to an intelligent driving vehicle and may include a camera 1601 and a vehicle controller 1602.

The camera 1601 is configured to take a photograph or a video of an intersection.

The camera may be mounted in the front of the vehicle.

If the front camera of the vehicle has a small shooting angle range, the intelligent driving system may further include a rear camera or a side camera.

In a case that the camera 1601 is mounted in the front of the vehicle, the camera may be mounted under a front license plate frame, above a front license plate frame, on a front license plate, under a left rearview mirror, under a right rearview mirror, or on a wheel trim of a front wheel. The wheel trim is a semicircular component protruding from a fender above a car tire.

In a case that the camera 1601 is mounted in the rear of the vehicle, the camera may be mounted under a rear license plate frame, above a rear license plate frame, on a rear license plate, or on a wheel trim of a rear wheel.

In a case that the camera 1601 is mounted on the side of the vehicle, the camera may be mounted under the left rearview mirror, under the right rearview mirror, or on the two sides of a chassis.

A photosensitive chip of the camera 1601 may be a charge coupled device (CCD) or a complementary metal-oxide semiconductor (CMOS). The two photosensitive chips both have high sensitivity and high resolution, which can take a photograph or a video of an intersection with high quality even in bright, cloudy or light-poor conditions.

The vehicle controller 1602 is configured to:

acquire, based on the photograph or the video of the intersection taken by the camera, a coordinate of a first road from which a vehicle is to leave and a coordinate of a second road into which the vehicle is to enter, and generate a reference running track based on the coordinate of the first road and the coordinate of the second road, and the first road and the second road intersect at the intersection through which the vehicle is to pass;

generate, in real time, a preview track of the vehicle based on a coordinate of a centroid of the vehicle, a course of the vehicle and the coordinate of the second road, during the vehicle passing through the intersection;

compare the preview track of the vehicle with the reference running track and acquire a running speed limit and a turning angle of the vehicle based on the comparing; and control the vehicle to run at the turning angle and a running speed less than or equal to the running speed limit.

The vehicle controller 1602 is a core control component of the vehicle and is configured to coordinate and control operation states of all electronic devices of the device and the vehicle by collecting signals of the electronic devices and making decisions based on the signals. The vehicle controller 1602 can implement at least one of the following functions: driver intention resolving, drive control, brake control, torque monitoring, vehicle energy management, vehicle driving status monitoring, fault monitoring and fault diagnosis.

The vehicle controller 1602 may communicate with the camera 1601 via a controller area network (CAN) bus.

In one embodiment, the camera 1601 may include a wireless transmitting module, and the vehicle controller 1602 may include a wireless receiving module.

The camera 1601 may transmit the shot image or video of an intersection via the wireless transmitting module to the wireless receiving module of the vehicle controller 1602.

In the intelligent driving system applied to an intelligent driving vehicle according to the present embodiment, a camera transmits a shot photograph or video of an intersection to a vehicle controller. Since the color of the lane boundary is different from the color of the road surface, the vehicle controller may generate a reference running track by acquiring, from the photograph or video based on the colors, a coordinate of a first road from which the vehicle is to leave and a coordinate of a second road into which the vehicle is to enter. The vehicle controller then generates, in real time, a preview track of the vehicle based on a coordinate of a centroid of the vehicle, a course of the vehicle and the coordinate of the second road, acquires a running speed limit and a turning angle of the vehicle by comparing the preview track of the vehicle with the reference running track, and controls the vehicle to run at the turning angle and a running speed less than or equal to the running speed limit, so that the deviation between the track of the vehicle in the actual running process and the reference running track is as small as possible, and the vehicle passes through the intersection without lane line under the guidance of the reference running track, thereby ensuring driving safety and reducing traffic accidents.

Based on the method and the device for controlling a vehicle passing through an intersection and the intelligent driving system according to the embodiments, it should be noted that, all or a part of steps in the method embodiment may be implemented by a computer program instructing related hardware, and the program may be stored in a computer readable storage medium. Therefore, a computer readable storage medium for intelligent driving is provided according an embodiment. An operation principle thereof is described below in detail.

A computer readable storage medium is provided according to the present embodiment. A computer program is stored on the computer readable storage medium and the computer program, when executed by a processor, causes the processer to:

generate a reference running track based on a coordinate of a first road from which the vehicle is to leave and a coordinate of a second road into which the vehicle is to enter, and the first road and the second road intersect at the intersection through which the vehicle is to pass;

generate, in real time, a preview track of the vehicle based on a coordinate of a centroid of the vehicle, a course of the vehicle and the coordinate of the second road, during the vehicle passing through the intersection;

compare the preview track of the vehicle with the reference running track and acquire a running speed limit and a turning angle of the vehicle based on the comparing; and control the vehicle to run at the turning angle and a running speed less than or equal to the running speed limit.

The computer readable storage medium may be a magnetic disk, an optical disk, a read-only memory (ROM) or a random access memory (RAM), and the like.

According to the present embodiment, a reference running track is generated based on a coordinate of a first road from which the vehicle is to leave and a coordinate of a second road into which the vehicle is to enter, a preview track of the vehicle is generated in real time based on a coordinate of a centroid of the vehicle, a course of the vehicle and the coordinate of the second road, a running speed limit and a turning angle of the vehicle are acquired by comparing the preview track of the vehicle with the reference running track, and the vehicle is controlled to run at the turning angle and a running speed less than or equal to the running speed limit, so that the deviation between the track of the vehicle in the actual running process and the reference running track is as small as possible, and the vehicle passes through the intersection without lane line under the guidance of the reference running track, thereby ensuring driving safety and reducing traffic accidents.

The foregoing embodiments are embodiments of the disclosure and are not meant to limit the disclosure. The embodiments according to the disclosure are disclosed above, and are not intended to limit the disclosure. In some embodiments, based on the disclosed technical content, some variations and improvements on the technical solutions of the disclosure, or make some equivalent variations on the embodiments, without departing from the scope of the technical solutions.

The invention claimed is:

1. A method for controlling a vehicle passing through an intersection, comprising:

generating a reference running track based on a coordinate of a first road from which the vehicle is to leave and a coordinate of a second road into which the vehicle is to enter, wherein the first road and the second road intersect at the intersection through which the vehicle is to pass;

generating, in a real time manner, a preview track of the vehicle based on a coordinate of a centroid of the vehicle, a course of the vehicle and the coordinate of the second road, during the vehicle passing through the intersection;

comparing the preview track of the vehicle with the reference running track and acquiring a running speed limit and a turning angle of the vehicle based on the comparing; and controlling the vehicle to run at the turning angle and a running speed less than or equal to the running speed limit, wherein generating, in a real time manner, the preview track of the vehicle based on the coordinate of the centroid of the vehicle, the course of the vehicle and the coordinate of the second road comprises:

acquiring a vector of the course based on the centroid of the vehicle and the course of the vehicle;

acquiring a vector of an entering end of the second road based on a third intersection point formed by intersecting one of two lane boundaries of a lane of the second road into which the vehicle is to enter with a stop line of the lane of the second road and a fourth intersection point formed by intersecting the other one of the two lane boundaries of the lane of the second road with the stop line of the lane of the second road; and generating the preview track of the vehicle based on the vector of the course and the vector of the entering end of the second road, wherein the comparing the preview track of the vehicle with the reference running track and acquiring the running speed limit and the turning angle of the vehicle based on the comparing comprises:

acquiring a shortest-distance intersection point on the reference running track which has a shortest-distance to the centroid of the vehicle, calculating a distance between the shortest-distance intersection point and the centroid of the vehicle, and taking the distance as a position deviation between the centroid of the vehicle and the reference running track;

acquiring a course deviation based on the vector of the course and an intersection point vector corresponding to the shortest-distance intersection point;

acquiring a curvature deviation based on a turning radius of the vehicle and a curvature radius of the reference running track at the shortest-distance intersection point;

acquiring the turning angle based on the position deviation, the course deviation and the curvature deviation; and acquiring the running speed limit based on the curvature radius and a preset lateral acceleration limit.

2. The method according to claim 1, wherein generating the reference running track based on the coordinate of the first road from which the vehicle is to leave and the coordinate of the second road into which the vehicle is to enter comprises:

acquiring a vector of a leaving end of the first road based on a first intersection point formed by intersecting one of two lane boundaries of a lane of the first road where the vehicle is located with a stop line of the lane of the first road and a second intersection point formed by intersecting the other one of the two lane boundaries of the lane of the first road with the stop line of the lane of the first road;

acquiring a vector of an entering end of the second road based on a third intersection point formed by intersecting one of two lane boundaries of a lane of the second road into which the vehicle is to enter with a stop line of the lane of the second road and a fourth intersection point formed by intersecting the other one of the two lane boundaries of the lane of the second road with the stop line of the lane of the second road; and generating the reference running track based on the vector of the leaving end of the first road and the vector of the entering end of the second road.

3. The method according to claim 2, wherein before generating the reference running track, the method further comprises:

converting the vector of the leaving end of the first road and the vector of the entering end of the second road into a rectangular coordinate system of the intersection, wherein the rectangular coordinate system of the intersection is a rectangular coordinate system with a midpoint of a connection line between the first intersection point and the second intersection point as an origin, the vector of the leaving end of the first road as an x-axis, and a line perpendicular to the x-axis as a y-axis.

4. The method according to claim 1, wherein before generating the preview track of the vehicle, the method further comprises:

converting the vector of the course and the vector of the entering end of the second road into a rectangular coordinate system of the intersection, wherein the rectangular coordinate system of the intersection is a rectangular coordinate system with a midpoint of a connection line between a first intersection point formed by intersecting one of two lane boundaries of a lane of the first road where the vehicle is located with a stop line of the lane of the first road and a second intersection point formed by intersecting the other one of the two lane boundaries of the lane of the first road with the stop line of the lane of the first road as an origin, a vector of a leaving end of the first road as an x-axis, and a line perpendicular to the x-axis as a y-axis.

5. The method according to claim 1, wherein acquiring the turning angle based on the position deviation, the course deviation and the curvature deviation comprises acquiring the turning angle based on the position deviation, the course deviation and the curvature deviation by the following equation:

$$\delta = K_{offset} \Delta P_v P_t + K_{azimuth} \Delta P'_t P'_v + K_{radius} \Delta R_v R_t$$

where $\Delta P_v P_t$ represents the position deviation, $\Delta P'_t P'_v$ represents the course deviation, $\Delta R_v R_t$ represents the curvature deviation, and $K_{offset}$, $K_{azimuth}$ and $K_{radius}$ represent preset weight coefficients for the position deviation, the course deviation and the curvature deviation, respectively.

6. The method according to claim 1, wherein before acquiring the curvature deviation based on the turning radius of the vehicle and the curvature radius of the reference running track at the shortest-distance intersection point, the method further comprises:

acquiring the turning radius of the vehicle based on a steering wheel angle of the vehicle, a yaw rate and a speed of the vehicle.

7. An intelligent driving system applied to vehicle, comprising:

a camera configured to take a photograph or a video of an intersection; and a vehicle controller configured to:

acquire, based on the photograph or the video of the intersection taken by the camera, a coordinate of a first road from which a vehicle is to leave and a coordinate of a second road into which the vehicle is to enter, and generate a reference running track based on the coordinate of the first road and the coordinate of the second road, wherein the first road and the second road intersect at the intersection through which the vehicle is to pass;

generate, in a real time manner, a preview track of the vehicle based on a coordinate of a centroid of the vehicle, a course of the vehicle and the coordinate of the second road, during the vehicle passing through the intersection;

compare the preview track of the vehicle with the reference running track and acquire a running speed limit and a turning angle of the vehicle based on the comparing; and control the vehicle to run at the turning angle and a running speed less than or equal to the running speed limit, wherein the vehicle controller, in generating in a real time manner the preview track of the vehicle based on the coordinate of the centroid of the vehicle, the course of the vehicle and the coordinate of the second road, is further configured to:

acquire a vector of the course based on the centroid of the vehicle and the course of the vehicle;

acquire a vector of an entering end of the second road based on a third intersection point formed by intersecting one of two lane boundaries of a lane of the second road into which the vehicle is to enter with a stop line of the lane of the second road and a fourth intersection point formed by intersecting the other one of the two lane boundaries of the lane of the second road with the stop line of the lane of the second road; and generate the preview track of the vehicle based on the vector of the course and the vector of the entering end of the second road, wherein the vehicle controller, in comparing the preview track of the vehicle with the reference running track and acquiring the running speed limit and the turning angle of the vehicle based on the comparing, is further configured to:

acquire a shortest-distance intersection point on the reference running track which has a shortest-distance to the centroid of the vehicle, calculate a distance between the shortest-distance intersection point and the centroid of the vehicle, and take the distance as a position deviation between the centroid of the vehicle and the reference running track;

acquire a course deviation based on the vector of the course and an intersection point vector corresponding to the shortest-distance intersection point;

acquire a curvature deviation based on a turning radius of the vehicle and a curvature radius of the reference running track at the shortest-distance intersection point;

acquire the turning angle based on the position deviation, the course deviation and the curvature deviation; and acquire the running speed limit based on the curvature radius and a preset lateral acceleration limit.

8. The intelligent driving system according to claim 7, wherein the vehicle controller, in generating the reference running track based on the coordinate of the first road from which the vehicle is to leave and the coordinate of the second road into which the vehicle is to enter, is further configured to:

acquire a vector of a leaving end of the first road based on a first intersection point formed by intersecting one of two lane boundaries of a lane of the first road where the vehicle is located with a stop line of the lane of the first road and a second intersection point formed by intersecting the other one of the two lane boundaries of the lane of the first road with the stop line of the lane of the first road;

acquire a vector of an entering end of the second road based on a third intersection point formed by intersecting one of two lane boundaries of a lane of the second road into which the vehicle is to enter with a stop line of the lane of the second road and a fourth intersection point formed by intersecting the other one of the two lane boundaries of the lane of the second road with the stop line of the lane of the second road; and generate the reference running track based on the vector of the leaving end of the first road and the vector of the entering end of the second road.

9. The intelligent driving system according to claim 8, wherein the vehicle controller is further configured to:

convert the vector of the leaving end of the first road and the vector of the entering end of the second road into a rectangular coordinate system of the intersection, wherein the rectangular coordinate system of the intersection is a rectangular coordinate system with a midpoint of a connection line between the first intersection point and the second intersection point as an origin, the vector of the leaving end of the first road as an x-axis, and a line perpendicular to the x-axis as a y-axis.

10. The intelligent driving system according to claim 7, wherein the vehicle controller is further configured to:

convert the vector of the course and the vector of the entering end of the second road into a rectangular coordinate system of the intersection, wherein the rectangular coordinate system of the intersection is a rectangular coordinate system with a midpoint of a connection line between a first intersection point formed by intersecting one of two lane boundaries of a lane of the first road where the vehicle is located with a stop line of the lane of the first road and a second intersection point formed by intersecting the other one of the two lane boundaries of the lane of the first road with the stop line of the lane of the first road as an origin, a vector of a leaving end of the first road as an x-axis, and a line perpendicular to the x-axis as a y-axis.

11. A non-transitory computer readable storage medium on which a computer program is stored, wherein the computer program, when executed by a processor, causes the processer to:

generate a reference running track based on a coordinate of a first road from which the vehicle is to leave and a coordinate of a second road into which the vehicle is to enter, wherein the first road and the second road intersect at the intersection through which the vehicle is to pass;

generate, in a real time manner, a preview track of the vehicle based on a coordinate of a centroid of the vehicle, a course of the vehicle and the coordinate of the second road, during the vehicle passing through the intersection;

compare the preview track of the vehicle with the reference running track and acquire a running speed limit and a turning angle of the vehicle based on the comparing; and control the vehicle to run at the turning angle and a running speed less than or equal to the running speed limit, wherein the computer program further causes the processor to:

acquire a vector of the course based on the centroid of the vehicle and the course of the vehicle;

acquire a vector of an entering end of the second road based on a third intersection point formed by intersecting one of two lane boundaries of a lane of the second road into which the vehicle is to enter with a stop line of the lane of the second road and a fourth intersection point formed by intersecting the other one of the two lane boundaries of the lane of the second road with the stop line of the lane of the second road; and generate the preview track of the vehicle based on the vector of the course and the vector of the entering end of the second road, wherein the computer program further causes the processor to:

acquire a shortest-distance intersection point on the reference running track which has a shortest-distance to the centroid of the vehicle, calculate a distance between the shortest-distance intersection point and the centroid of the vehicle, and take the distance as a position deviation between the centroid of the vehicle and the reference running track;

acquire a course deviation based on the vector of the course and an intersection point vector corresponding to the shortest-distance intersection point;

acquire a curvature deviation based on a turning radius of the vehicle and a curvature radius of the reference running track at the shortest-distance intersection point;

acquire the turning angle based on the position deviation, the course deviation and the curvature deviation; and acquire the running speed limit based on the curvature radius and a preset lateral acceleration limit.

12. The non-transitory computer readable storage medium according to claim 11, wherein the computer program is further cause the processor to:

acquire a vector of a leaving end of the first road based on a first intersection point formed by intersecting one of two lane boundaries of a lane of the first road where the vehicle is located with a stop line of the lane of the first road and a second intersection point formed by intersecting the other one of the two lane boundaries of the lane of the first road with the stop line of the lane of the first road;

acquire a vector of an entering end of the second road based on a third intersection point formed by intersecting one of two lane boundaries of a lane of the second road into which the vehicle is to enter with a stop line of the lane of the second road and a fourth intersection point formed by intersecting the other one of the two lane boundaries of the lane of the second road with the stop line of the lane of the second road; and generate the reference running track based on the vector of the leaving end of the first road and the vector of the entering end of the second road.

13. The non-transitory computer readable storage medium according to claim 12, wherein the computer program is further cause the processor to:

convert the vector of the leaving end of the first road and the vector of the entering end of the second road into a rectangular coordinate system of the intersection, wherein the rectangular coordinate system of the intersection is a rectangular coordinate system with a midpoint of a connection line between the first intersection point and the second intersection point as an origin, the vector of the leaving end of the first road as an x-axis, and a line perpendicular to the x-axis as a y-axis.

14. The non-transitory computer readable storage medium according to claim 11, wherein the computer program is further cause the processor to:

convert the vector of the course and the vector of the entering end of the second road into a rectangular coordinate system of the intersection, wherein the rectangular coordinate system of the intersection is a rectangular coordinate system with a midpoint of a connection line between a first intersection point formed by intersecting one of two lane boundaries of a lane of the first road where the vehicle is located with a stop line of the lane of the first road and a second intersection point formed by intersecting the other one of the two lane boundaries of the lane of the first road with the stop line of the lane of the first road as an origin, a vector of a leaving end of the first road as an x-axis, and a line perpendicular to the x-axis as a y-axis.

* * * * *